US 11,540,647 B2

(12) United States Patent
Bates

(10) Patent No.: US 11,540,647 B2
(45) Date of Patent: Jan. 3, 2023

(54) PORTABLE BABY DIAPER CHANGING PLATFORM FOR USE IN A MOTOR VEHICLE

(71) Applicant: Breanna Bates, Snoqualmie, WA (US)

(72) Inventor: Breanna Bates, Snoqualmie, WA (US)

(*) Notice: Subject to any disclaimer, the term of this patent is extended or adjusted under 35 U.S.C. 154(b) by 225 days.

(21) Appl. No.: 16/989,915

(22) Filed: Aug. 11, 2020

(65) Prior Publication Data

US 2022/0047093 A1 Feb. 17, 2022

(51) Int. Cl.
*A47D 5/00* (2006.01)
*A45F 4/02* (2006.01)
*A45C 9/00* (2006.01)
*A45F 4/06* (2006.01)
*B60R 7/04* (2006.01)
*A45F 3/02* (2006.01)

(52) U.S. Cl.
CPC ............ *A47D 5/006* (2013.01); *A45C 9/00* (2013.01); *A45F 4/02* (2013.01); *A45F 3/02* (2013.01); *A45F 4/06* (2013.01); *B60R 7/04* (2013.01)

(58) Field of Classification Search
CPC ........ A47D 5/006; A47D 15/003; A47D 5/00; A47D 15/00; A47D 15/008; A45F 4/02; A45F 4/06; A45F 3/04; A45F 3/02; A45F 2003/003; A47G 9/02; A47G 9/066; A47G 9/083; Y10S 5/947; A45C 13/02; A45C 9/00; B60R 7/043
See application file for complete search history.

(56) References Cited

U.S. PATENT DOCUMENTS

| 5,099,530 A * | 3/1992 | Scott .................. A47G 9/02 5/500 |
| 5,692,257 A * | 12/1997 | Albertieri ................ A47D 5/00 5/655 |
| 10,716,410 B2 * | 7/2020 | Iizumi .................... A47D 5/006 |
| 2004/0211003 A1 * | 10/2004 | Stackman .............. A47D 5/006 5/655 |
| 2006/0289582 A1 * | 12/2006 | Killilea .................. A47D 5/006 224/575 |
| 2008/0016623 A1 * | 1/2008 | Gold .................... A47D 5/006 5/655 |

* cited by examiner

Primary Examiner — David R Hare
Assistant Examiner — Madison Emanski
(74) Attorney, Agent, or Firm — Alloy Patent Law; Walker Griffin Weitzel

(57) ABSTRACT

A portable diaper changing pad for use in a motor vehicle includes a flexible elongated diaper changing pad with one or more fold lines, a flap member having multiple vertically and horizontally laid semi-rigid sections separated by horizontal and vertical fold lines. The horizontally laid segments of the flap member fold with the pad to transform into a handheld bag for storage and portability, and the vertically laid segments are selectively transformed into a required configuration for facilitating efficient and effective use of the diaper changing pad. The diaper changing pad further includes another flap member having one or more pockets suitably sized for accommodating one or more baby care products.

13 Claims, 10 Drawing Sheets

PORTABLE BABY DIAPER CHANGING PLATFORM FOR USE IN A MOTOR VEHICLE

FIELD OF THE INVENTION

The present disclosure generally relates to baby care products, and more particularly to a portable diaper changing platform that can be used for changing a diaper of a baby in a passenger motor vehicle such as a car.

BACKGROUND

Changing a baby's diaper is a common task for parents and other caregivers. While at home, the caregivers are able to change the diaper of the baby comfortably. However, changing the diaper of the baby while on the go is a more challenging task for the caregivers.

Traditionally, a caregiver may perform a diaper changing process by placing the baby on a floor or some other flat surface, but this process has its own challenges and may be uncomfortable for the baby. In some instances, a caregiver may carry a diaper changing station with them and use it as a part of the diaper changing process. Usually, when the caregiver is required to change the diaper of the baby, the caregiver may put the baby on a changing area of the diaper changing station to support the baby during the diaper changing process. Typically, these diaper changing stations are configured in the form of a single or multiple furniture pieces. These diaper changing stations are bulkier and are not comfortable to be carried by the caregivers when leaving their home.

Further, while traveling for an outstation, if the caregivers are required to change the diaper of the baby, then they may have to search for a public restroom with a changing table to carry out the diaper changing process. However, it is a noted fact that, most of the changing tables or public restrooms are laid dirty and may be unhygienic for the baby.

Further, when traveling with the baby in a motor vehicle (such as a car), a situation occasionally arises for changing the diaper of the baby and there is usually no space available outside for changing the diaper except the space in the motor vehicle. The easiest thing is then to do the changing of the diaper on one of the back seats of the motor vehicle by placing the baby on a back seat. However, most of the passenger motor vehicle's seats are sloped and it is likely the baby, when laid onto the seat, will slide into the crevice of the seat and the seat belt buckles, which may be again uncomfortable for the baby. Further, sometimes, the vehicle's seat, where the diaper changing process is carried out, may come in contact with the baby's poop as many children tend to squirm while changing the diaper.

Having an ability to change the baby's diaper in the comfort of one's own motor vehicle is the ideal situation while the caregivers are travelling and highly preferred by the caregivers. Although, it might be possible to carry traditionally available diaper changing pads in the vehicle which is usually provided for use in the home, such available portable diaper changing pads are not designed to fit the dimensions of the seat of the motor vehicle and not reliable enough to assure secure lateral support for the baby.

In the prior art, a number of solutions are proposed by inventors to changing a baby on the go. Some of these solutions attempt to make the changing pad portable that can fold up into a handheld size, and have even tried to address the problem of the baby sliding into the seat belt buckles and crevice of the sloped seats while the caregivers carry out diaper changing process on the vehicle's seat. For example, US20080016623 discloses an elongated flexible cushioned pad. The patent application proposes a pair of generally wedge-shaped flap members hingedly connected to the bottom surface of the changing system that can fold up along a centrally located longitudinal line to form a cradle like configuration inhibiting smaller infants from rolling off of the changing pad and keeping the infant in place while changing the diaper or allowing an infant to rest. U.S. Pat. No. 9,241,581 discloses an adjustable pad configuration that can conform to a variety of different types and/or configurations of surfaces in order to provide a level, cushioning, and/or stabilizing support platform for a child when the child's diaper needs to be changed. U.S. Pat. No. 5,852,838 discloses a cushion for use with sloped vehicle seats, to provide a substantially level and horizontal surface upon which to change infant's diapers. This patented cushion in this reference has a generally triangular cross section, featuring a relatively thin front edge, and a relatively thick rear edge. The angle provided by these kinds of cushions is fixed, they are not versatile and can only work with vehicle seats with a slope that matches with the slope of the cushion. Further, these cushion type changing pad does not fold up to occupy small space rather need separate storage space in the vehicle. Similarly, other existing prior art solutions have their own shortcomings.

Thus, although solutions do exist, such solutions either make the pad thicker and wedge shaped to provide a level surface on the seat of the motor vehicle, or do not offer portability or lack reliable assurance to provide lateral support for the baby to prevent the baby from sliding into the crevice of the seat and seat belt buckles.

SUMMARY

Accordingly, the present invention is based on the recognition of the advantages of adapting a diaper changing platform or pad to the available space in a passenger motor vehicle such as a car.

It is an objective of the present invention to provide a portable baby diaper changing system that can be used for changing a diaper of a baby in a passenger motor vehicle, particularly on a vehicle's seat. The portable baby diaper changing system may include a diaper changing pad having one or more fold lines on its top surface and a first flap member. The diaper changing pad is foldable along the one or more fold lines. The first flap member is laterally attached to the diaper changing pad. The portable baby diaper changing system may further include a second flap member that is attached to the first flap member of the diaper changing pad. The second flap member includes a plurality of horizontally and vertically laid rigid or semi-rigid sections that are separated by one or more horizontal fold lines and one or more vertical fold lines. The horizontally laid rigid or semi-rigid sections of the plurality of horizontally and vertically laid rigid or semi-rigid sections are adapted to be repeatedly folded along the one or more horizontal fold lines together along the one or more fold lines of the diaper changing pad to transform the diaper changing pad into a compact form for storage and ease of carrying. The vertically laid rigid or semi-rigid sections of the plurality of horizontally and vertically laid rigid or semi-rigid sections are adapted to be repeatedly folded along the one or more vertical fold lines to transform into a wedge-shaped configuration that is placed underneath the diaper changing pad for at least providing a level surface to the diaper changing pad, when the diaper changing pad is laid unfolded on a relatively sloped surface.

In an embodiment, the diaper changing pad further includes a top layer, a bottom layer, and an intermediate padded layer disposed therebetween. At least the top layer is a waterproof layer. The second flap member is fixedly or removably attached to the diaper changing pad. The second flap member further includes a top layer, a bottom layer, and an intermediate layer disposed therebetween. At least the top layer is a waterproof layer, and the intermediate layer comprises of a material selected from a group consisting of a foam, a plastic, or some wood.

The portable baby diaper changing system further comprises a portable diaper bag that is removably or fixedly attached to the diaper changing pad. The portable diaper bag is laterally attached to the diaper changing pad on an opposing side to the first flap member by means of at least two webbing straps with snap connectors. An inside of the portable diaper bag comprises a plurality of pockets for accommodating one or more baby care products. An outside of the portable diaper bag comprises a back pocket, a front pocket, and a key ring. The compact form of the diaper changing pad and the second flap member is inserted or placed inside the portable diaper bag that can be carried over a shoulder or wrist by a caregiver. The portable diaper bag further comprises a hook and loop closure for securing the portable diaper bag when the diaper changing pad and the second flap member are folded into the bag. The diaper changing pad further comprises one or more headrests that are configured for resting a baby's head thereon.

In an embodiment, a shape of the diaper changing pad and the second flap member is identical. Further, a size of the second flap member is less than or equal to the diaper changing pad.

In an embodiment, the second flap member is used as a bumper or barrier when it is not used as the wedge-shaped configuration underneath the diaper changing pad.

In an embodiment, the second flap member further comprises a plurality of connectors or fasteners that is used for connecting to the first flap member of the diaper changing pad. In an embodiment, a backside and a frontside of the second flap member further comprises a plurality of connectors or fasteners. The plurality of connectors or fasteners on the backside of the second flap member is used for connecting to the plurality of connectors or fasteners on the frontside of the second flap member.

The ability of the second flap member to be folded and placed under the pad changing section facilitate in transforming the proposed portable diaper changing pad into a compact form. In the example embodiment, the compact form is a handheld bag that can be conveniently carried by the caregiver. For the vehicle seats that are not as sloped, the first flap member can be placed perpendicular or at an angle to the changing pad section creating the barrier between the pad changing section and back of the vehicle's seat and associated straps and buckles.

According to an embodiment of the present invention, the first and second flap members may be removably attached to the diaper changing pad. According to another embodiment, the first and second flap members may be fixedly attached to the pad changing section of the diaper changing pad. Further, the proposed diaper changing pad is made using a soft and skin friendly materials ensuring the diaper changing pad is machine washable.

Additionally, another objective of the present invention is to provide a portable diaper changing pad that can be used for general purposes without any limitation to the changing the diaper within the motor vehicle. The portable diaper changing pad provides a larger surface area when compared to a standard size portable changing mat commonly available in the market. The larger surface area is basically achieved by configuring the diaper changing pad in an unfolded configuration (with the pad changing section and second flap member in completely opened state) on a clean and flat surface. This larger surface area covered by the diaper changing pad may be used as a tummy time mat or a play time mat instead of having a need to purchase a new mat for tummy time or play time. In other words, the second flap member attached to the portable changing pad may be useful for extending the surface area covered by the changing mat when unfolded and thus makes the proposed portable changing pad even suitable for tummy time and play time of the baby.

It is another objective of the present invention to provide a versatile portable diaper changing pad that can also be used outside of the motor vehicle and not limited to sloped seats of the motor vehicle.

These and other features and advantages of the present invention will become apparent from the detailed description below, in light of the accompanying drawings.

BRIEF DESCRIPTION OF ACCOMPANYING DRAWINGS

The present invention is illustratively shown and described in reference to the accompanying drawings, in which.

DETAILED DESCRIPTION

Figure 1A:
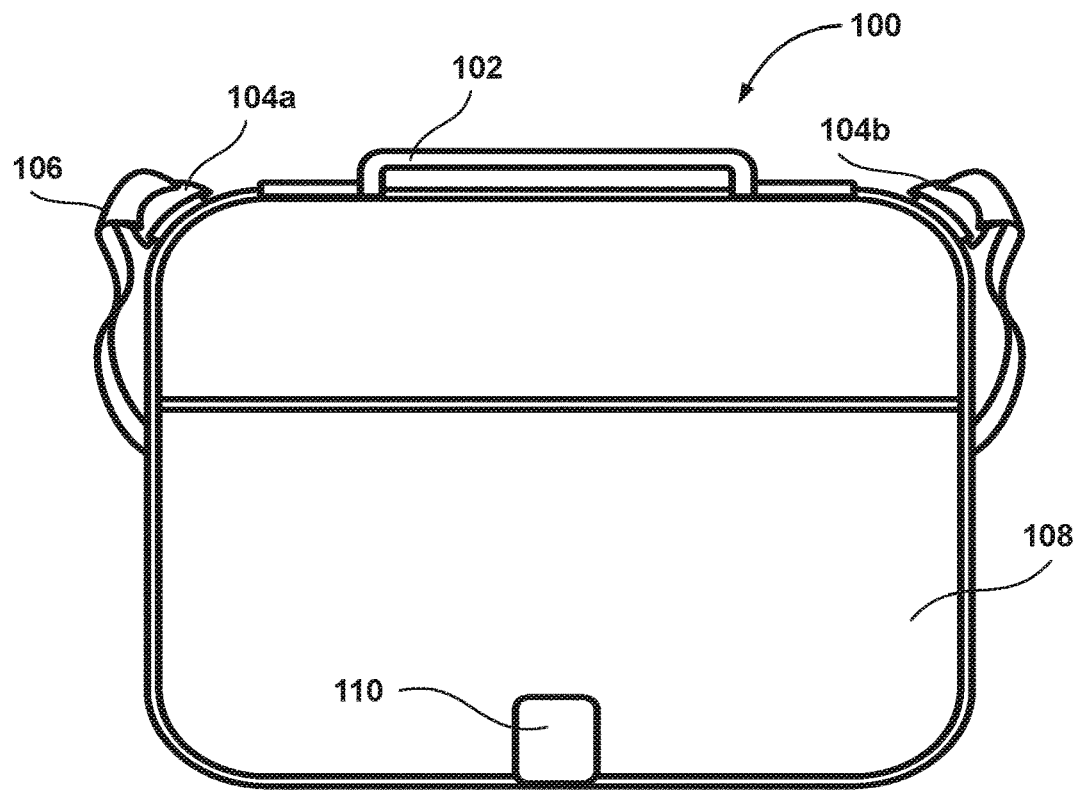
FIG. 1A is a diagram that illustrates a back view of a compact handheld bag, according to an exemplary embodiment of the present invention.

As used in the specification and claims, the singular forms "a", "an" and "the" may also include plural references. For example, the term "an article" may include a plurality of articles. Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present invention. There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of components, which constitutes a portable diaper changing pad for use in a motor vehicle. The proposed diaper changing pad is repeatedly folded along defined fold lines to transform into a compact form (handheld bag form) and unfolded to function as the diaper changing pad. Accordingly, the components have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the present invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the present invention.

References to terms "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment. The words "comprising", "having", "containing", and "including", and other forms thereof, are intended to be equivalent in meaning and be open ended in that an item or items following any one of these words is not meant to be an exhaustive listing of such item or items or meant to be limited to only the listed item or items.

Unless stated otherwise, terms such as "first" and "second" are used to arbitrarily distinguish between the elements or entities. Thus, these terms are not necessarily intended to indicate temporal or other prioritization of such elements or priorities. While various exemplary embodiments of the disclosed systems and apparatuses have been described below, it should be understood that they have been presented for purposes of example only, and not limitations. It is not exhaustive and does not limit the present invention to the precise form disclosed. Modifications and variations are possible in light of the below teachings or may be acquired from practicing of the present invention, without departing from the breadth or scope. For the purpose of this invention and throughout this document, the term "semi-rigid" is used to describe horizontally laid sections and vertically laid sections of a flap member and is intended to mean, and should be construed as, having at least some rigidity or stiffness so that when the vertically laid sections are folded along vertical fold lines, the flap member can transform to somewhat rigid structure. For example, when folded as desired by a user, the flap may transform to a wedge-shaped configuration or a bumper (or barrier) that may facilitate the leveling of surface of the diaper changing pad with respect to the vehicle's seat or separate the diaper changing pad from the vehicle's seat and associated buckles. Further, the term "flat surface" as used herein refers to a plane surface, as an example, the objects that demonstrate examples for plan surfaces include but not limited to a table, a floor, yoga mat, and so on. Likewise, the term "sloped surface" as used herein refers to surfaces which are not flat, for example, a vehicle's seat.

The portable diaper changing pad for use in a motor vehicle and its ability to be repeatedly folded along defined fold lines to transform into a compact form (i.e., a handheld bag form) and unfolded to function as the diaper changing pad will now be described with reference to the accompanying drawings, particularly with respect to FIGS. 1-8.

Figure 2:
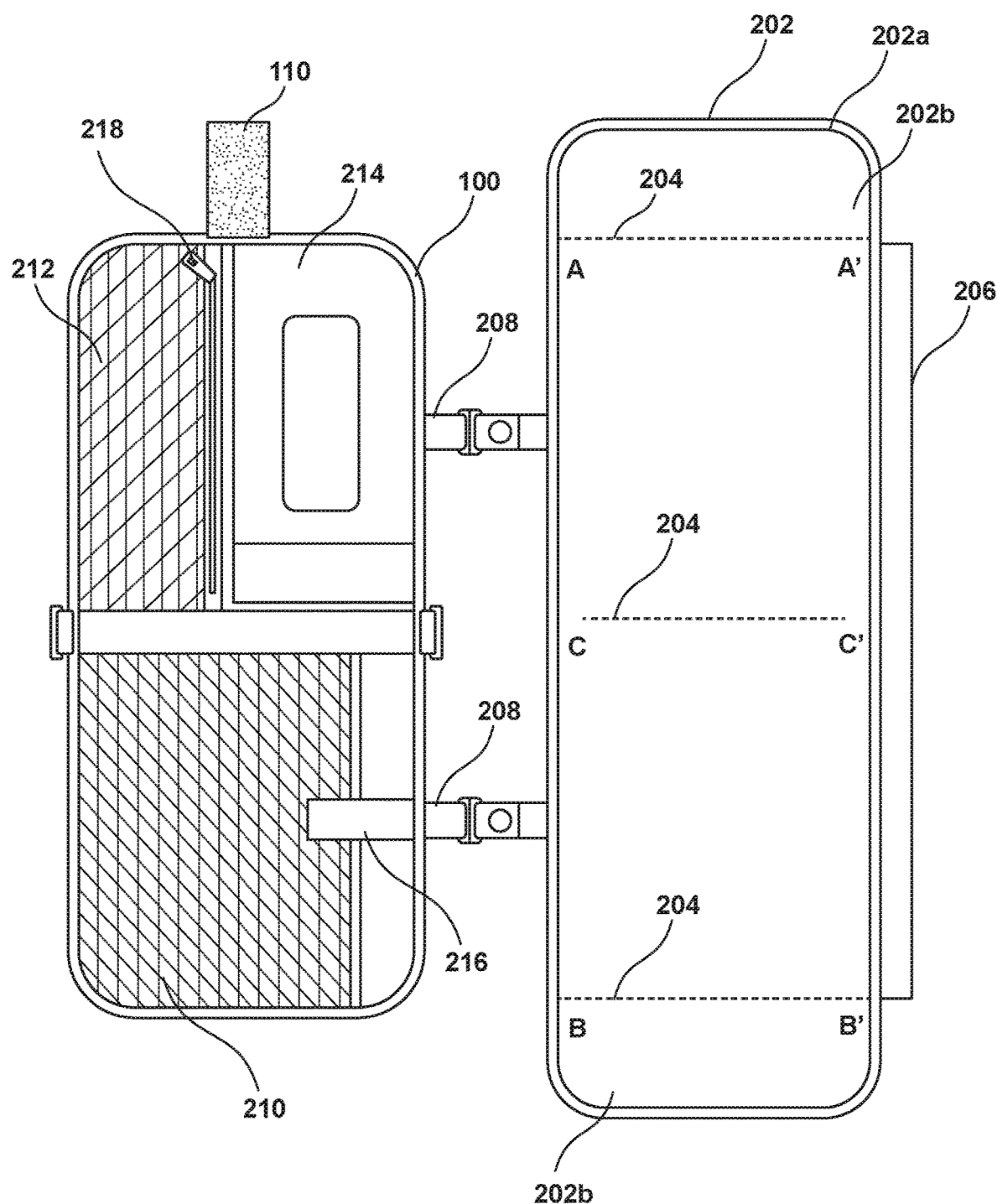
FIG. 2 is a diagram that illustrates a portable diaper changing pad of the compact handheld bag in its complete unfolded state, according to an exemplary embodiment of the present invention.
Figure 3A:
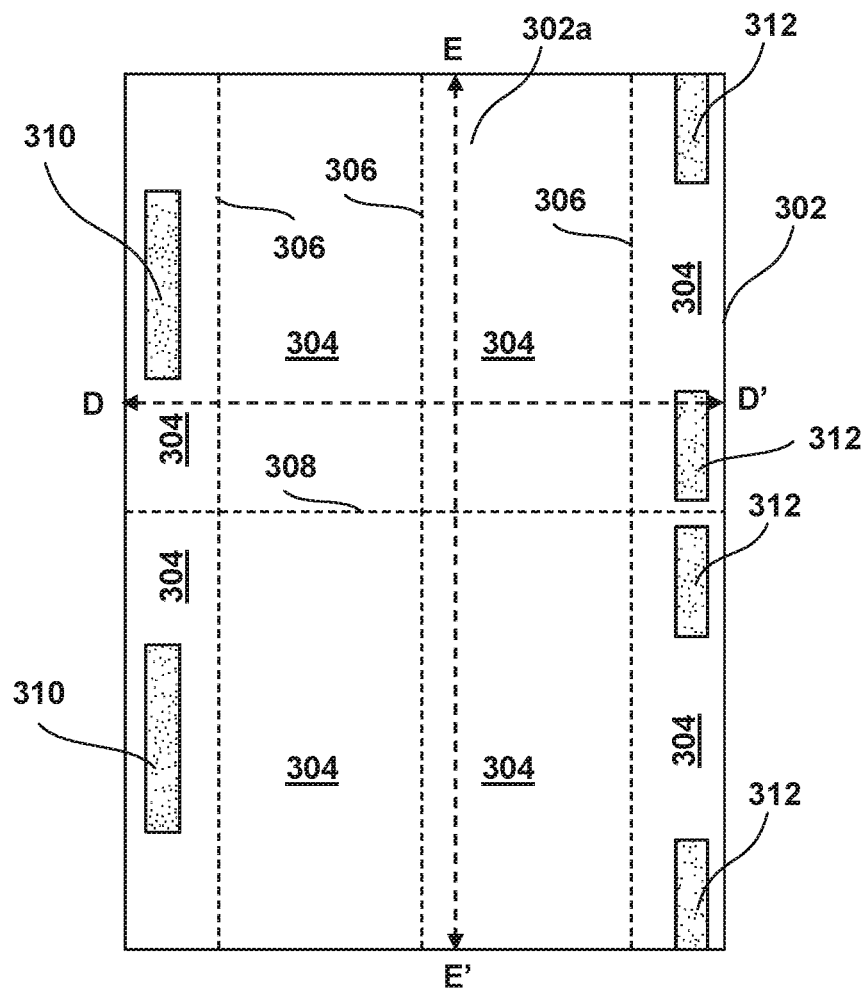
FIG. 3A is a diagram that illustrates a back view of a flap member of the compact handheld bag in its complete unfolded state, according to an exemplary embodiment of the present invention.
Figure 3B:
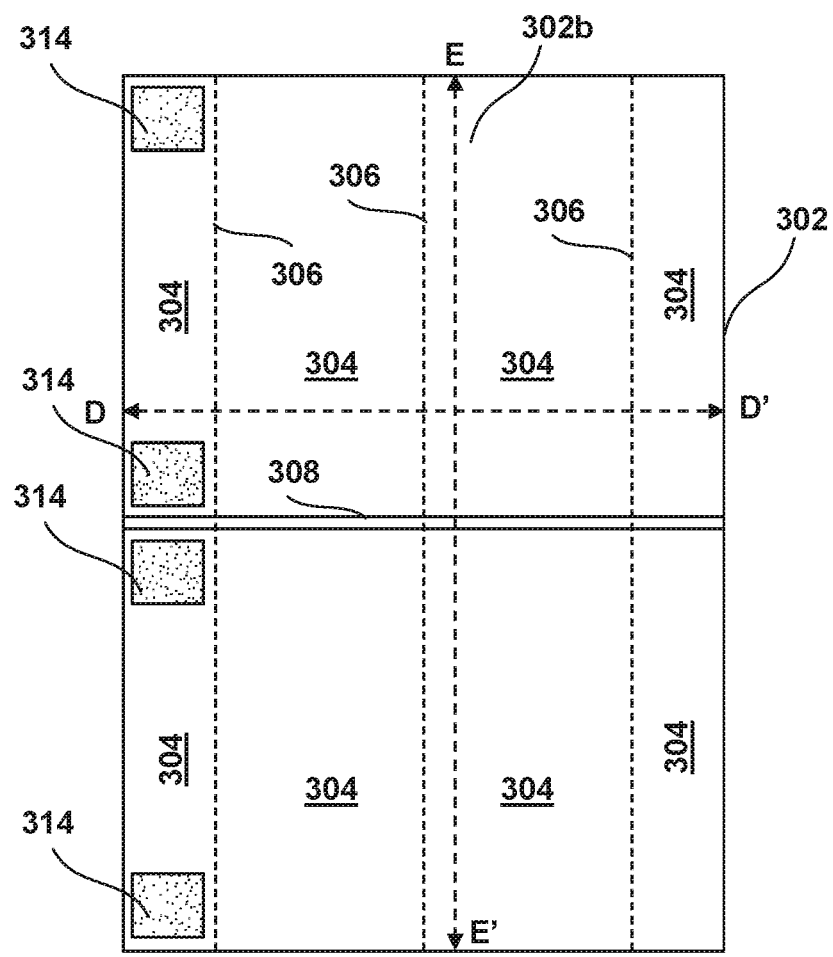
FIG. 3B is a diagram that illustrates a front view of the flap member of compact handheld bag in its complete unfolded state, according to an exemplary embodiment of the present invention.

FIG. 1A is a diagram that illustrates a back view of a compact handheld bag 100, according to an exemplary embodiment of the present invention. The bag 100 is a modular bag that is used for storing and carrying a portable diaper changing pad (as shown in FIG. 2) and a flap member (as shown in FIGS. 3A and 3B). The bag 100 may be further used for storing and carrying one or more diapers, clothes, bibs, wipes, or the like.

In an embodiment, the bag 100 includes a handle 102, a plurality of strap connectors 104a and 104b (hereinafter, the strap connectors 104), and a strap 106. The handle 102 is a part of, or attachment to, an object (such as the bag 100) that can be moved or used by a hand of a user. The handle 102 may be removably attached to the bag 100. In an exemplary embodiment, the handle 102 may be made up of a plastic material, a metallic material, a synthetic material, a clothing material, or the like. The strap connectors 104 may be used for removably connecting the strap 106 to the bag 100. Once connected, the strap 106 may be used by the user to carry the bag 100. In an exemplary embodiment, the strap connectors 104 may be made up of a plastic material, a metallic material, a synthetic material, a clothing material, or the like. In an exemplary embodiment, the strap 106 may be made up of a plastic material, a synthetic material, a clothing material, or the like.

In an embodiment, the backside of the bag 100 may include a back pocket 108. The pocket 108 may be used for storing one or more items such as paper, diary, pen, or the like. In an embodiment, the bag 100 may further include a hook and loop closure/fastener 110 (e.g., Velcro®, hereinafter, Velcro). The hook and loop closure/fastener 110 may be a strap with Velcro closure. This may include a male Velcro and a female Velcro. The male Velcro may be attached to a strap that is configured at a front surface of the bag 100. The female Velcro may be configured at a back surface of the bag 100. The male Velcro and the female Velcro may be removably attached or connected to form a closure of the bag 100.

Figure 1B:
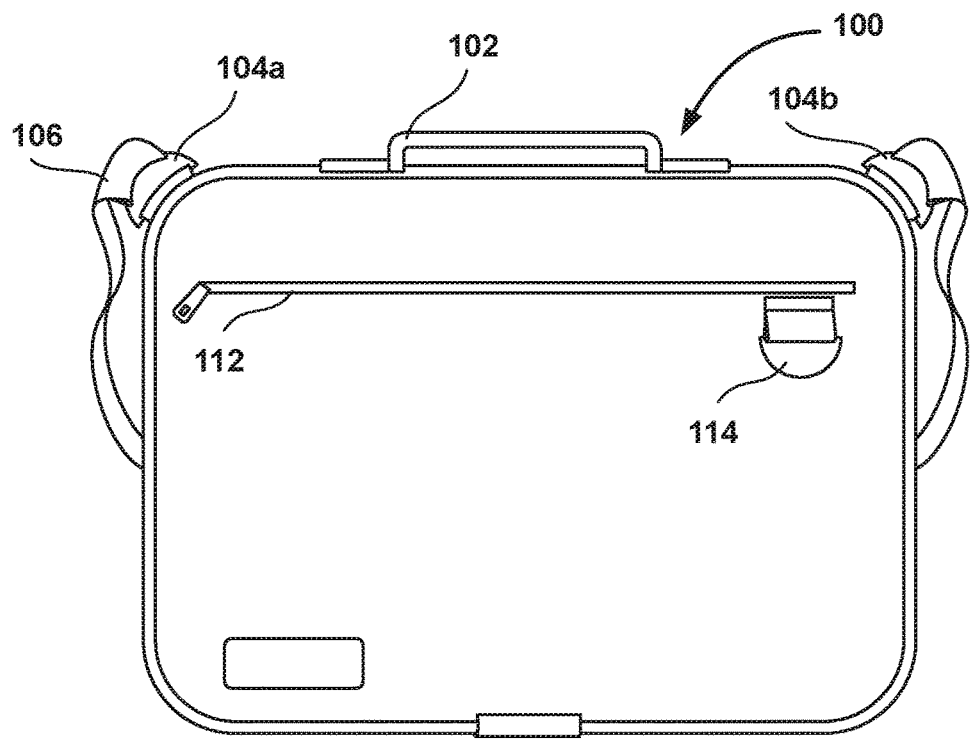
FIG. 1B is a diagram that illustrates a front view of the compact handheld bag, according to an exemplary embodiment of the present invention.

FIG. 1B is a diagram that illustrates a front view of the compact handheld bag 100, according to an exemplary embodiment of the present invention. As illustrated, the bag 100 includes the handle 102, the strap connectors 104, and the strap 106. In an embodiment, the frontside of the bag 100 may include a pocket 112 and a key ring 114. The pocket 112 may be a zippered pocket that can be used for storing one or more items such as paper, diary, pen, or the like. The key ring 114 is a small chain, usually made from metal or plastic, that connects a small item to it. The length of the key ring 114 allows an item to be used more easily than if connected directly to the key ring 114. Some keyrings allow one or both ends the ability to rotate, keeping the keychain from becoming twisted, while the item is being used.

FIG. 2 is a diagram that illustrates a portable diaper changing pad 202 of the compact handheld bag 100 in its complete unfolded state, according to an exemplary embodiment of the present invention. As shown in FIG. 2, the bag 100 and the diaper changing pad 202 in the bag 100 has been unfolded in its complete state such that the bag 100 and the diaper changing pad 202 are lying on a horizontal surface and the bag 100 shows its inside view. In an exemplary embodiment, the inside of the bag 100 includes a plurality of pockets such as a pocket 210, a pocket 212, and a pocket 214. The pocket 210 is a mesh pocket that can be used for storing one or more diapers, clothes, bibs, or the like. The pocket 210 may be opened or closed by using a hook and loop closure/fastener 216 (e.g., Velcro tab closure). The pocket 212 is a zippered mesh pocket that can be opened or closed by using a zipper 218. The pocket 214 may be used for storing one or more diapers, wipes, or other similar baby care products. It should be understood that any other suitable mechanism that facilitate removable attachment or opening/closing of the pocket 210, 212, or 214 may also be used.

In an embodiment, the bag 100 may be removably attached or connected to the diaper changing pad 202 by means of a strap 208. The strap 208 is a webbing strap with snap connectors. The attachment or detachment of the diaper changing pad 202 with the bag 100 may be performed by closing or opening the snap connectors of the strap 208. In the shown embodiments of FIG. 2, the diaper changing pad 202 is attached to the bag 100 by means of the webbing strap with the snap connectors (i.e., the strap 208).

In an embodiment, the diaper changing pad 202 may correspond to a flexible elongated pad changing section that is substantially rectangular in shape. However, a person having ordinary skill in the art would understand that the diaper changing pad 202 may be shaped in some other forms as well without limiting the scope of the present invention. The diaper changing pad 202 may be preferably made using a plurality of layers such as a top layer and a bottom layer. One or more of the plurality of layers may be waterproof layers. In some embodiments, the plurality of layers may also include an intermediate padded layer that is disposed between the top layer and the bottom layer. The intermediate padded layer may include foam, cotton, or any other type of padding or cushioning material that would make the proposed diaper changing pad 202 comfortable for use. The top layer may be preferably made using but not limited to plastic or vinyl. The bottom layer may be made using material same as that of the top layer. In some other embodiments, the bottom layer may be made using other materials, such as for example, nylon, cotton, polyester, or other type of similar material. The plurality of layers is preferably sewn to form the diaper changing pad 202. The diaper changing pad 202 so formed includes a top surface or changing surface 202a over which a baby is placed for changing the diaper of the baby. The diaper changing pad 202 further includes a bottom surface (not shown but is opposite to and below the top surface 202a) that is directly in contact with a surface where the diaper changing pad 202 is laid upon unfolded. The diaper changing pad 202 further includes one or more fold lines 204. In an exemplary embodiment, the fold lines 204 are laterally extending towards two opposing sides of the diaper changing pad 202. The fold lines 204 are reinforced fold lines which are lines of stitching sewn through the top surface 202a, the intermediate padded layer, and the bottom surface of the diaper changing pad 202 that help in folding of the diaper changing pad 202. The diaper changing pad 202 may be foldable along the fold lines 204 for ease of portability and storage. For example, for one fold line 204, the diaper changing pad 202 may be folded along a horizontal axis A-A'. Similarly, for another fold line 204, the diaper changing pad 202 may be folded along a horizontal axis B-B'. Similarly, for another fold line 204, the diaper changing pad 202 may be folded along a horizontal axis C-C'. In an exemplary embodiment, the diaper changing pad 202 may be folded along the one or more fold lines 204 to reduce the overall size of the diaper changing pad 202 so that the diaper changing pad 202 is easy to carry by storing it in the bag 100.

In an embodiment, the diaper changing pad 202 may further include one or more headrests 202b that are configured over the top surface 202a. The headrests 202b are generally formed by applying extra padding within the top layer, particularly the intermediate padded layer will have extra padding applied in the areas of headrests 202b. The headrests 202b are padded flaps provided at ends of the diaper changing pad 202 to protect the baby's head from center console and seat belt buckle in a front or back seat of the motor vehicle. In the presented embodiment, the diaper changing pad 202 includes two headrests 202b facilitating bidirectional use of the diaper changing pad 202 for the baby. In some other embodiments, the diaper changing pad 202 may just include one headrest 202b. In some other embodiments, the diaper changing pad 202 may be configured without any headrests 202b.

In an embodiment, the diaper changing pad 202 may further include a flap member 206 that is attached to the diaper changing pad 202. The flap member 206 may be provided with a Velcro on underside to connect to another flap member (such as a wedge or a bumper). For example, the flap member 206 may include a female Velcro that connects or joins with a male Velcro of another flap member. In some other examples, the flap member 206 may include a male Velcro that connects or joins with a female Velcro of another flap member. A person having ordinary skills in the art would understand that the flap member 206 may be provided with other fasteners (such as a webbing strap with snap connectors or a zipper) without limiting the scope of the present invention.

FIG. 3A is a diagram that illustrates a back view 302a of a flap member 302 of the compact handheld bag 100 in its complete unfolded state, according to an exemplary embodiment of the present invention. The flap member 302 may be substantially rectangular in shape. However, it should be understood that the flap member 302 may be shaped in some other forms as well without limiting the scope of the present invention. However, for the implementation of the invention, it is desirable that the shape and size of the diaper changing pad 202 and the flap member 302 are identical. In one exemplary embodiment, the shape of the diaper changing pad 202 may be identical to the shape of the flap member 302, but the size of the flap member 302 may be less than or equal to the size of the diaper changing pad 202. The flap member 302 may be used as a foldable wedge or a bumper attachment that provides a level surface for the changing pad while on sloped surfaces or provides a barrier while on flatter surfaces. In an exemplary embodiment, the flap member 302 includes a plurality of layers such as a top layer and a bottom layer. At least one of the plurality of layers may be a waterproof layer. The plurality of layers may also include an intermediate layer that is disposed between the top layer and the bottom layer. The intermediate layer may include but not limited to foam material, plastic material, or wooded material. The top layer is preferably made of but not limited to plastic or vinyl. The bottom layer in one embodiment may be made using the same material as that of the top layer. In some other embodiments, the bottom layer may be made using other materials such as for example, nylon, cotton, polyester, or other type of similar material. In one specific embodiment, each of the plurality of layers is made from ABS plastic material and is covered or sewn into a water-resistant fabric to form the flap member 302.

In an embodiment, the flap member 302 may include one or more horizontally and vertically laid rigid or semi-rigid sections 304. The one or more horizontally and vertically laid rigid or semi-rigid sections 304 may be separated by one or more horizontal fold lines 308 and one or more vertical fold lines 306. In the example shown in FIG. 3A, the flap member 302 includes eight horizontally and vertically laid rigid or semi-rigid sections 304, one horizontal fold line 308, and three vertical fold lines 306. These sections 304 may be made rigid or semi-rigid, and the rigidity may be achieved due to the presence of intermediate layer that comprises of material that demonstrates rigidity (from being flexible or slightly rigid), for example, plastic material (such as ABS plastic), foam material, fabric material, cardboard material, or the like. Further, as shown with respect to FIG. 3A, the horizontally laid rigid or semi-rigid sections 304 (i.e., the sections shown along the double headed arrows D-D') are adapted to be repeatedly folded along the horizontal fold lines 308 to transform the flap member 302 into a compact unit for storage and ease of carrying. For example, the flap member 302 folds into half by folding the horizontally laid rigid or semi-rigid sections 304 along the horizontal fold line 308. Similarly, the vertically laid rigid or semi-rigid sections 304 (i.e., the sections shown along the double headed arrows E-E') are adapted to be repeatedly folded along the vertical fold lines 306 to transform the flap member 302 into a compact unit for storage and ease of carrying.

In an embodiment, the backside 302a of the flap member 302 includes a plurality of connectors or fasteners 310 (such as a Velcro) that is used for connecting to the flap member 206 of the diaper changing pad 202. For example, the backside 302a of the flap member 302 may include a female Velcro that connects or joins with a male Velcro of the flap member 206. In some other examples, the backside 302a of the flap member 302 may include a male Velcro that connects or joins with a female Velcro of the flap member 206. A person having ordinary skills in the art would understand that the backside 302a of the flap member 302 may be provided with other fasteners (such as a webbing strap with snap connectors or a zipper) without limiting the scope of the present invention.

In an embodiment, the backside 302a of the flap member 302 further includes a plurality of connectors or fasteners 310 (such as a Velcro) that is used for connecting to other connectors or fasteners available on a frontside of the flap member 302 (shown in FIG. 3B). For example, the backside 302a of the flap member 302 may include 4 female Velcro that connects or joins with 4 male Velcro on the frontside of the flap member 302. In some other examples, the backside 302a of the flap member 302 may include 4 male Velcro that connects or joins with 4 female Velcro on the frontside of the flap member 302. A person having ordinary skills in the art would understand that the backside 302a of the flap member 302 may be provided with other fasteners (such as a webbing strap with snap connectors or a zipper) without limiting the scope of the present invention.

FIG. 3B is a diagram that illustrates a front view 302b of the flap member 302 of the compact handheld bag 100 in its complete unfolded state, according to an exemplary embodiment of the present invention. In an embodiment, the flap member 302 may include the one or more horizontally and vertically laid rigid or semi-rigid sections 304. The one or more horizontally and vertically laid rigid or semi-rigid sections 304 may be separated by the one or more horizontal fold lines 308 and the one or more vertical fold lines 306. In the example shown in FIG. 3B, the flap member 302 includes eight horizontally and vertically laid rigid or semi-rigid sections 304, one horizontal fold line 308, and three vertical fold lines 306. These sections 304 may be made rigid or semi-rigid, and the rigidity may be achieved due to the presence of intermediate layer that comprises of material that demonstrates rigidity (from being flexible or slightly rigid), for example, plastic material (such as ABS plastic), foam material, fabric material, cardboard material, or the like. Further, as shown with respect to FIG. 3B, the horizontally laid rigid or semi-rigid sections 304 (i.e., the sections shown along the double headed arrows D-D') are adapted to be repeatedly folded along the horizontal fold lines 308 to transform the flap member 302 into a compact unit for storage and ease of carrying. For example, the flap member 302 folds into half by folding the horizontally laid rigid or semi-rigid sections 304 along the horizontal fold line 308. Similarly, the vertically laid rigid or semi-rigid sections 304 (i.e., the sections shown along the double headed arrows E-E') are adapted to be repeatedly folded along the vertical fold lines 306 to transform the flap member 302 into a compact unit for storage and ease of carrying.

In an embodiment, the frontside 302b of the flap member 302 includes a plurality of connectors or fasteners 314 (such as a Velcro) that is used for connecting to the connectors or fasteners 312 available on the backside 302a of the flap member 302 (shown in FIG. 3A). For example, the frontside 302b of the flap member 302 may include 4 female Velcro that connects or joins with 4 male Velcro on the backside 302a of the flap member 302. In some other examples, the frontside 302b of the flap member 302 may include 4 male Velcro that connects or joins with 4 female Velcro on the backside 302a of the flap member 302. A person having ordinary skills in the art would understand that the frontside 302b of the flap member 302 may be provided with other fasteners (such as a webbing strap with snap connectors or a zipper) without limiting the scope of the present invention.

In an embodiment, the 8 rigid or semi-rigid sections 304 may be folded laterally into a wedge shape and may be connected to stay in place with fasteners or connectors 312 and 314 (such as the Velcro). These sections 304 are currently made from $1/16$ inch ABS plastic and are covered or sewn into a water-resistant fabric.

Figure 4A:
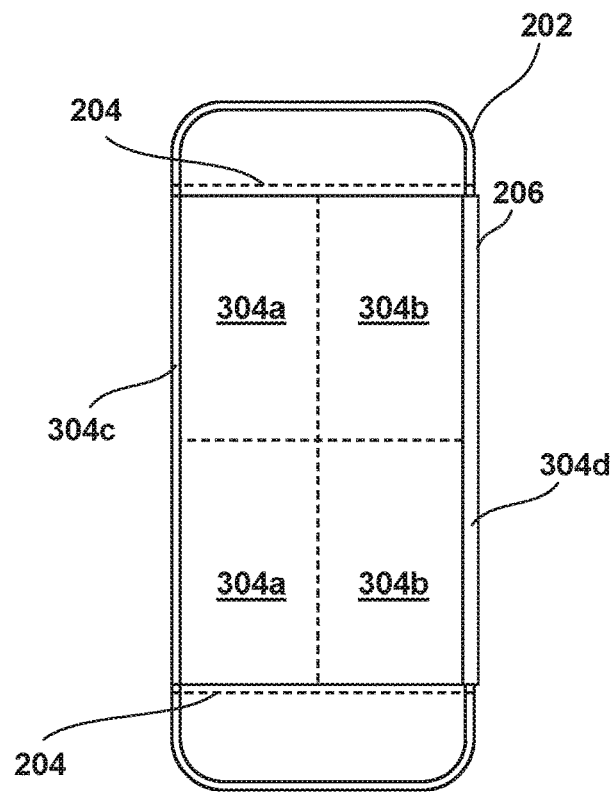
FIGS. 4A-4D are diagrams that collectively illustrates method steps adapted for completely folding the flap member (of FIGS. 3A and 3B) to transform into a wedge-shaped configuration for use with the portable diaper changing pad of FIG. 2, according to an exemplary embodiment of the present invention.
Figure 4B:
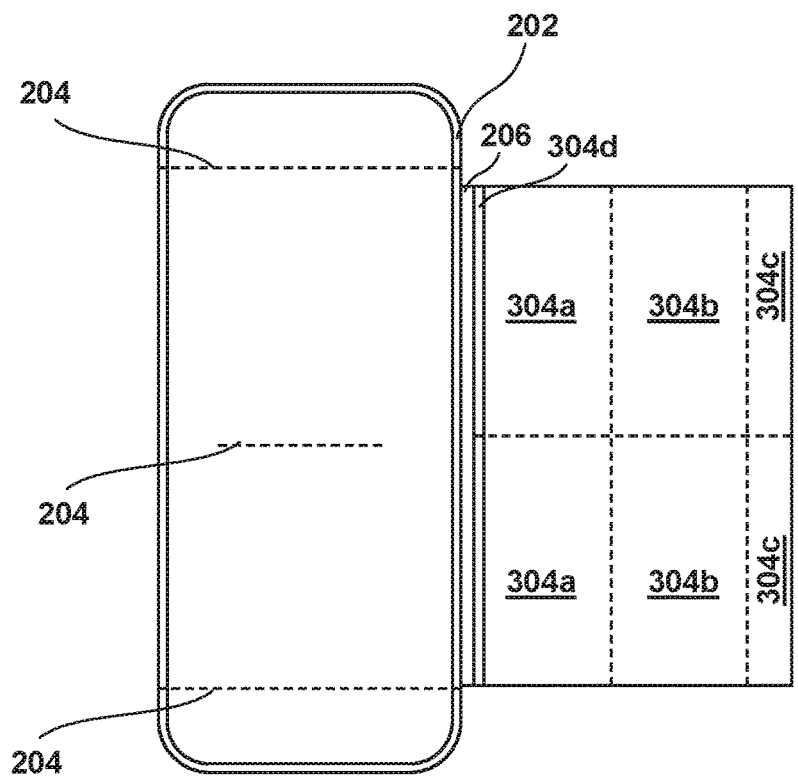
Figure 4C:
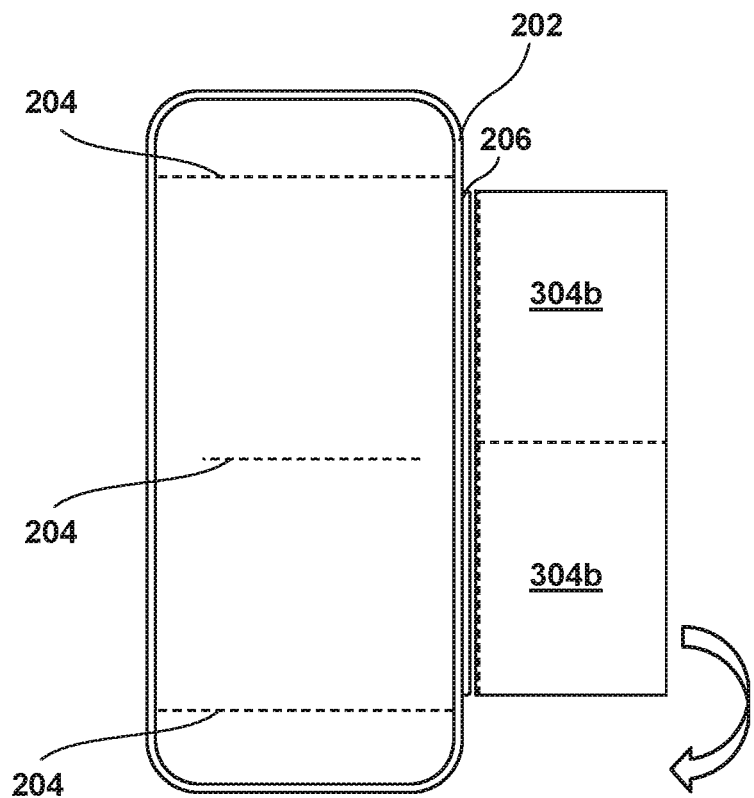
Figure 4D:
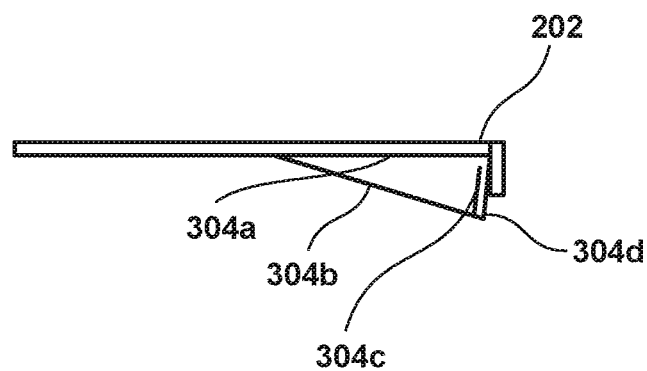

FIGS. 4A-4D are diagrams that collectively illustrates method steps adapted for completely folding the flap member 302 to transform into a wedge-shaped configuration for use with the portable diaper changing pad 202, according to an exemplary embodiment of the present invention. In FIG. 4A, two vertical end sections 304c and 304d have been folded underneath two vertical middle sections 304a and 304b. Further, the one vertical end section 304d is removably connected to the flap member 206 of the diaper changing pad 202 by means of the fastener or connector 310 (such as the Velcro) as shown in FIGS. 4B and 4C. Further, as shown in FIG. 4D, the sections 304b and 304c is folded up and the section 304c connects to the section 304d of the flap member 302 by means of the fasteners or connectors 312 and 314 to form the wedge shape configuration. The wedge shape configuration may be flipped or folded beneath the diaper changing pad 202 to provide a leveled surface for changing the diaper of the baby.

Figure 5A:
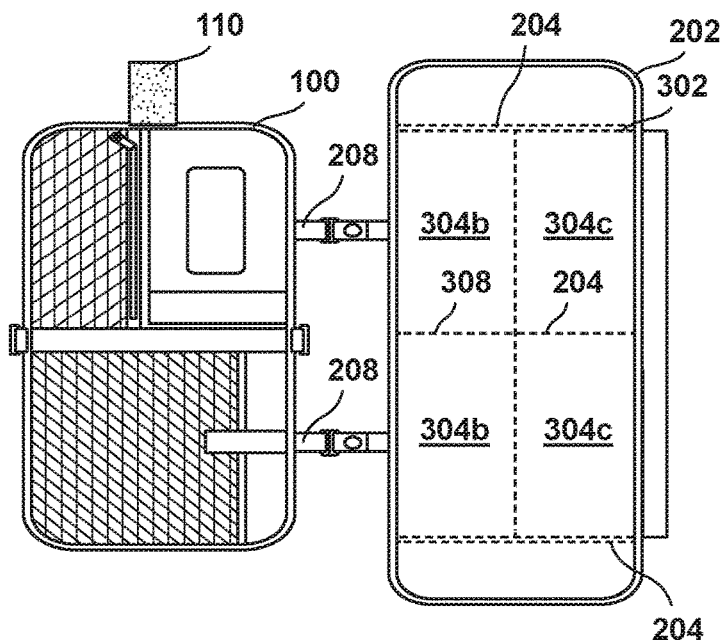
FIGS. 5A-5C are diagrams that collectively illustrates method steps adapted for completely folding the portable diaper changing pad and the flap member into the compact handheld bag for storage and ease of carrying, according to an exemplary embodiment of the present invention.
Figure 5B:
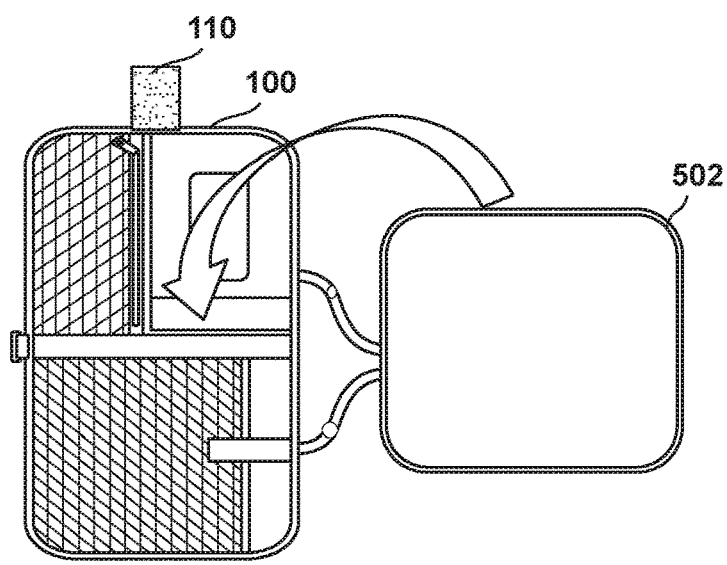
Figure 5C:
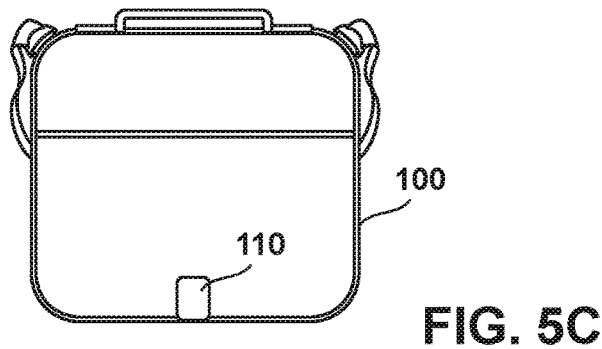

FIGS. 5A-5C are diagrams that collectively illustrates method steps adapted for completely folding the portable diaper changing pad 202 and the flap member 302 into the compact handheld bag 100 for storage and ease of carrying, according to an exemplary embodiment of the present invention. As shown, the bag 100 and the diaper changing pad 202 are in unfolded state. Further, the flap member 302 is placed over the diaper changing pad 202 such that the two vertical end sections 304c and 304d have been folded underneath two vertical middle sections 304a and 304b. Further, the diaper changing pad 202 is removably attached or connected to the bag 100 by means of the webbing strap with the snap connectors (i.e., the strap 208). In an exemplary embodiment, the flap member 302 is placed over the diaper changing pad 202 such that the two vertical end sections 304c and 304d have been folded underneath two vertical middle sections 304a and 304b and the one vertical end section 304d is removably attached or connected to the flap member 206 of the diaper changing pad 202. The flap member 302 may be placed over the diaper changing pad 202 such that only two vertical and horizontal sections 304b and 304c are visible as seen from the top as shown in FIG. 5A. Further, the diaper changing pad 202 is folded along the one or more fold lines 204 such that the flap member 302 is also folded beneath the diaper changing pad 202. As a result of the folding operation, a folded configuration 502 is obtained that is placed or inserted between the bag 100. Thereafter, the bag is closed by means of the fastener or closure 110 to obtain the portable handheld bag 100.

Figure 6:
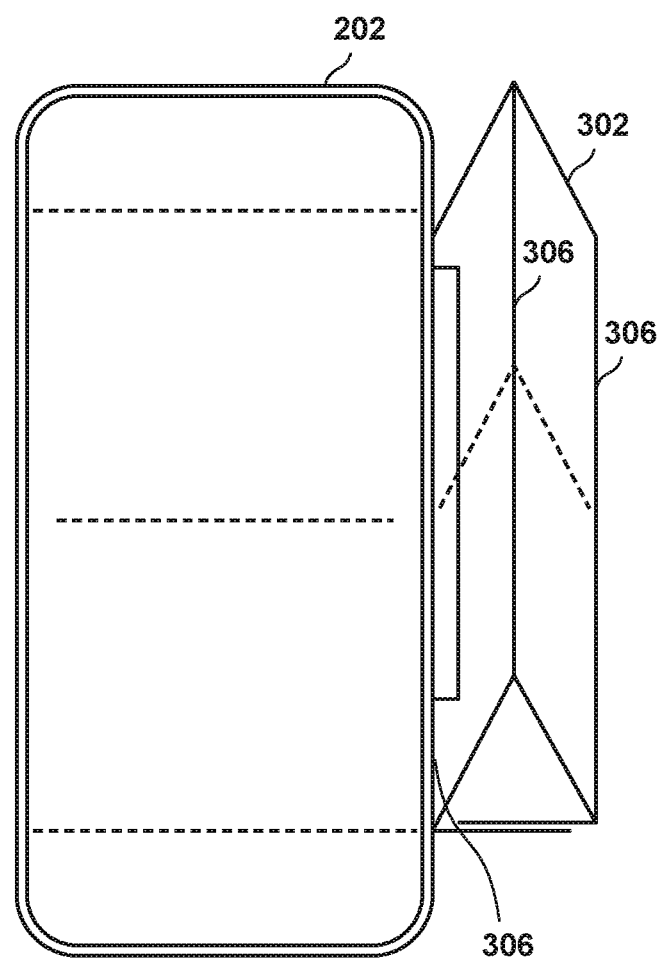
FIG. 6 is a diagram that illustrates the portable diaper changing pad with its flap member folded to transform into a barrier, according to an exemplary embodiment of the present invention.

FIG. 6 is a diagram that illustrates the portable diaper changing pad 202 with its flap member 302 folded to transform into a barrier, according to an exemplary embodiment of the present invention. Here, the vertically laid rigid or semi-rigid sections 304 are adapted to be repeatedly folded along the vertical fold lines 306 to transform into a barrier or bumper laid adjacent to the flexible elongated diaper changing pad 202. The barrier may act as a sturdy wall (when the vertically laid semi-rigid sections 304 are folded along the vertical fold lines 308). The barrier may substantially be laid perpendicular to the diaper changing pad 202. The functionality of the barrier is to provide a level surface (somewhat flat surface) to the flexible elongated diaper changing pad 202 when the diaper changing pad 202 is laid unfolded on a relatively sloped surface. Further, the barrier may protect a baby laid over the diaper changing pad 202 from rolling onto the lateral side (usually when the baby squirms during the diaper changing process), when the diaper changing pad 202 is laid unfolded on a relatively flat surface. Further, as shown in FIG. 6, the barrier may be configured in a triangular shape. However, it should be understood that based on the size of the flap member 302 and number of vertical fold lines 306 separating the vertical sections 304, one can achieve many different shapes for the barrier, when the flap member 302 is folded along the vertical fold lines 306. One can achieve multiple shapes such as for example, a square shape, a circular shape, or a polygonal shape depending upon the number of vertical fold lines 306 separating the vertical sections 304.

Figure 7:
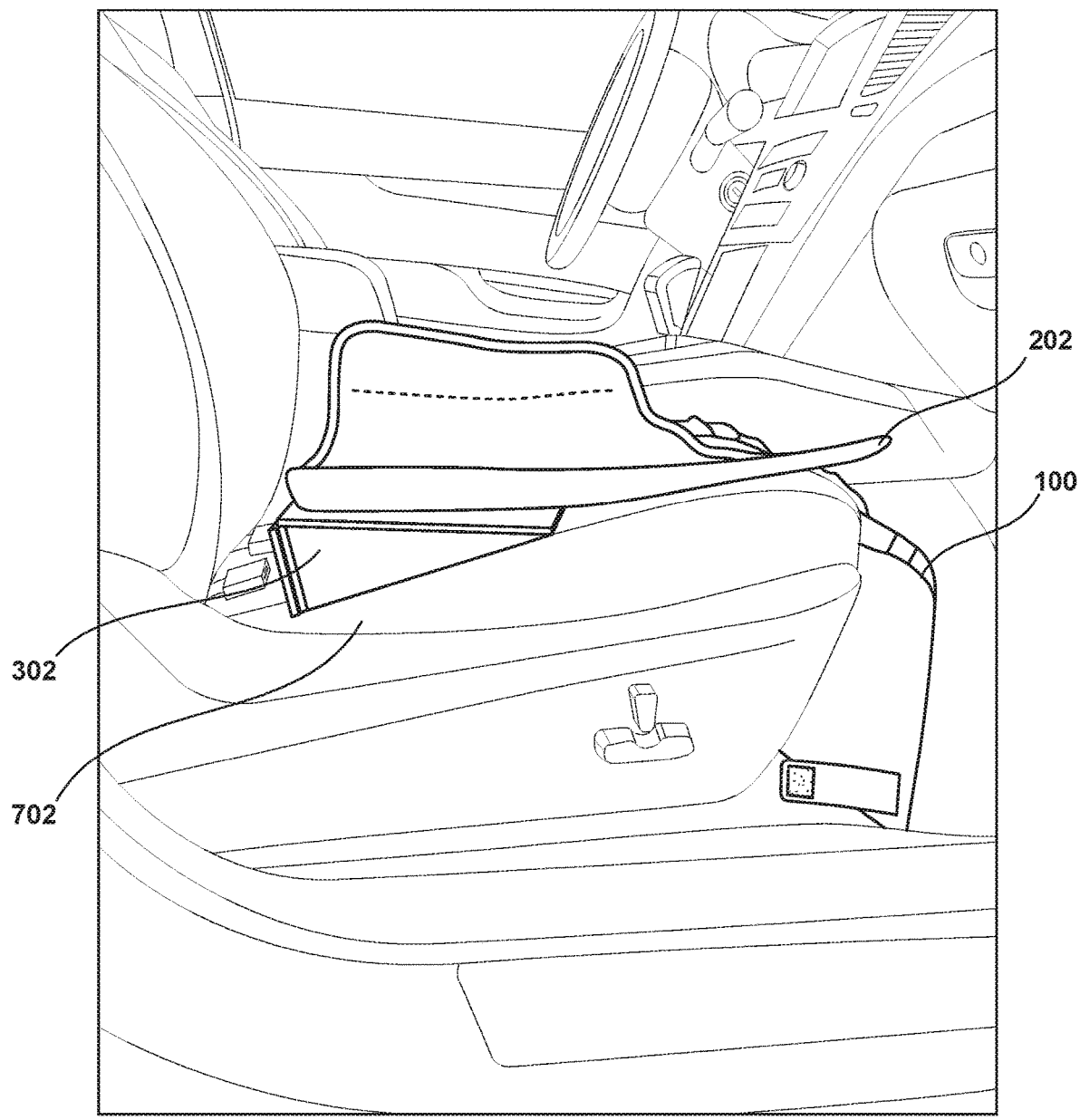
FIG. 7 is a diagram that illustrates placement of the portable diaper changing pad over a sloped seat of a motor vehicle, according to an exemplary embodiment of the present invention.

FIG. 7 is a diagram that illustrates placement of the portable diaper changing pad 202 over a sloped seat 702 of a motor vehicle, according to an exemplary embodiment of the present invention. As shown, the diaper changing pad 202 is placed on top of the sloped seat 702 of the motor vehicle. Further, to maintain the leveling surface of the diaper changing pad 202 on the sloped seat 702, the wedge-shaped flap member 302 is placed beneath the diaper changing pad 202.

Figure 8:
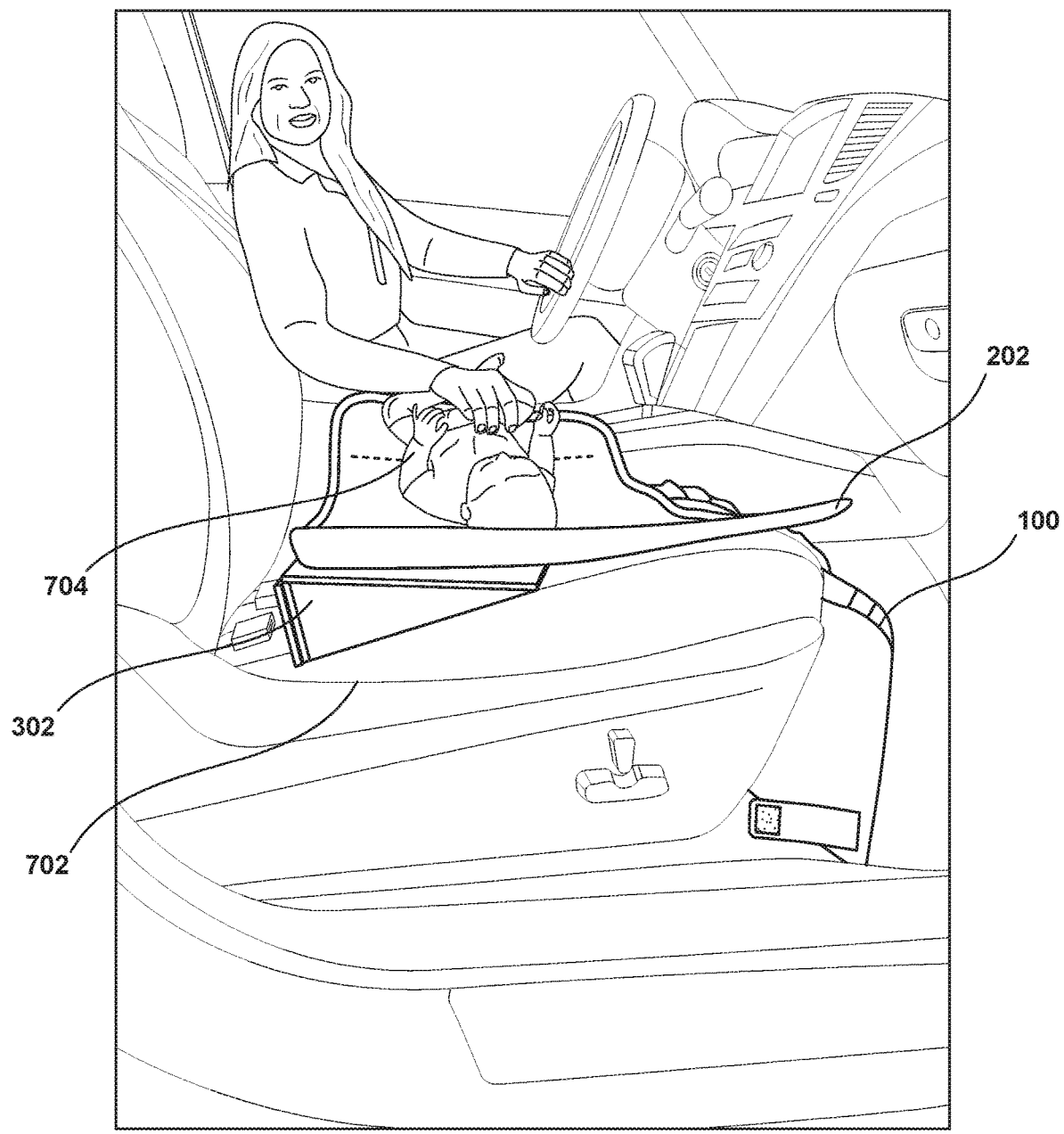
FIG. 8 is a diagram that illustrates use of the portable diaper changing pad in the motor vehicle, according to an exemplary embodiment of the present invention.

FIG. 8 is a diagram that illustrates use of the portable diaper changing pad 202 in the motor vehicle, according to an exemplary embodiment of the present invention. The use of the diaper changing pad 202 over the sloped seat 702 of the motor vehicle is shown herein in FIG. 8. More particularly, FIG. 8 shows the diaper changing pad 202 in its unfolded state and being used for changing the diaper of a baby 704 on the motor vehicle's seat 702. When a caregiver intends to change the diaper of the baby 704 over the vehicle's seat 702, firstly the diaper changing pad 202 is unfolded and is laid on the seating area/section of the vehicle's seat 702. The flap member 302 is then folded to form a wedge like structure that is placed beneath the diaper changing pad 202. This wedge-shaped configuration facilitates in maintaining a leveling surface with respect to the vehicle's seat 702. The baby 704 is then positioned over the diaper changing pad 202 with the baby's head rested on one of the two headrests 202b. The caregiver can then change the diaper of the baby 704 and optionally access diapers, wipes, or other similar baby care products stored in the one or more pockets of the bag 100. In some embodiments, the flap member 302 may be folded to form a barrier or bumper and is laid substantially perpendicular in the form of a separation wall adjacent to the diaper changing pad 202. With respect to the vehicle's seat 702, this barrier is placed against seat buckles or crevice of the seating section.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims. Although particular embodiments of the invention have been described in detail for purposes of illustration, various modifications and enhancements may be made without departing from the spirit and scope of the invention. The scope of the invention is accordingly defined by the following claims.

What is claimed is:

1. A portable baby diaper changing system, comprising:
a diaper changing pad having one or more fold lines on its top surface and a first flap member laterally attached at a side edge of the diaper changing pad, wherein the diaper changing pad is foldable along the one or more fold lines; and
a second flap member that is attached to the first flap member of the diaper changing pad, wherein the second flap member comprises a plurality of horizontally and vertically laid rigid or semi-rigid sections that are separated by one or more horizontal fold lines and one or more vertical fold lines, wherein the vertically laid rigid or semi-rigid sections of the plurality of horizontally and vertically laid rigid or semi-rigid sections of the second flap member are adapted to be repeatedly folded along the one or more vertical fold lines to transform into a wedge-shaped configuration that can be placed underneath the diaper changing pad for providing a level surface to the diaper changing pad, when the diaper changing pad is laid unfolded on a relatively sloped surface, and transform into a bumper that can be laid adjacent to the diaper changing pad to act as a barrier, when the diaper changing pad is laid unfolded on a relatively flat surface;
wherein the horizontally laid rigid or semi-rigid sections of the plurality of horizontally and vertically laid rigid or semi-rigid sections of the second flap member are adapted to be repeatedly folded along the one or more horizontal fold lines together along the one or more fold lines of the diaper changing pad to transform the diaper changing pad into a compact form for storage and ease of carrying; and
wherein a backside and a frontside of the second flap member further comprises a plurality of connectors or fasteners, wherein the plurality of connectors or fasteners on the backside of the second flap member is used for connecting to the plurality of connectors or fasteners on the frontside of the second flap member to transform into the wedge-shaped configuration and the bumper.

2. The portable baby diaper changing system of claim 1, wherein the diaper changing pad comprises a top layer, a bottom layer, and an intermediate padded layer disposed therebetween, and wherein at least the top layer is a waterproof layer.

3. The portable baby diaper changing system of claim 1, wherein the second flap member is fixedly or removably attached to the diaper changing pad.

4. The portable baby diaper changing system of claim 1, wherein the second flap member comprises a top layer, a bottom layer, and an intermediate layer disposed therebetween, wherein at least the top layer is a waterproof layer, and wherein the intermediate layer comprises of a material selected from a group consisting of a foam, a plastic, or a wood.

5. The portable baby diaper changing system of claim 1, further comprising a portable diaper bag that is removably or fixedly attached to the diaper changing pad such that when the diaper changing pad and the second flap member are folded to form a folded configuration, wherein the folded configuration is placed or inserted within the bag.

6. The portable baby diaper changing system of claim 5, wherein the portable diaper bag is laterally attached to the diaper changing pad on an opposing side to the first flap member by means of at least two webbing straps with snap connectors, and wherein inside of the portable diaper bag comprises a plurality of pockets for accommodating one or more baby care products.

7. The portable baby diaper changing system of claim 5, wherein outside of the portable diaper bag comprises a back pocket, a front pocket, and a key ring.

8. The portable baby diaper changing system of claim 5, wherein the compact form of the diaper changing pad and the second flap member is inserted or placed inside the portable diaper bag that can be carried over a shoulder or wrist by a caregiver.

9. The portable baby diaper changing system of claim 5, wherein the portable diaper bag further comprises a hook and loop closure for securing the portable diaper bag when the diaper changing pad and the second flap member are folded into the bag.

10. The portable baby diaper changing system of claim 1, wherein the diaper changing pad further comprises one or more headrests that are configured for resting a baby's head thereon.

11. The portable baby diaper changing system of claim 1, wherein a shape of the diaper changing pad and the second flap member is identical.

12. The portable baby diaper changing system of claim 1, wherein a size of the second flap member is less than or equal to the diaper changing pad.

13. The portable baby diaper changing system of claim 1, wherein the second flap member further comprises a plurality of connectors or fasteners that is used for connecting to the first flap member of the diaper changing pad.

* * * * *